(12) United States Patent
Nagai et al.

(10) Patent No.: US 6,705,964 B2
(45) Date of Patent: Mar. 16, 2004

(54) POWER TRANSMISSION SYSTEM

(75) Inventors: Masayuki Nagai, Shizuoka (JP); Masao Teraoka, Tochigi (JP)

(73) Assignees: Jatco LTD, Fuji (JP); Tochigi Fuji Sangyo Kabushiki Kaisha, Tochigi (JP)

(*) Notice: Subject to any disclaimer, the term of this patent is extended or adjusted under 35 U.S.C. 154(b) by 0 days.

(21) Appl. No.: 10/315,026

(22) Filed: Dec. 10, 2002

(65) Prior Publication Data
US 2003/0106734 A1 Jun. 12, 2003

(30) Foreign Application Priority Data
Dec. 11, 2001 (JP) .......................... 2001-377870

(51) Int. Cl.⁷ ............................................. F16H 37/02
(52) U.S. Cl. ...................................... 475/216; 74/606 R
(58) Field of Search ......................... 475/83, 207, 216; 74/606 R

(56) References Cited
U.S. PATENT DOCUMENTS
6,595,887 B2 * 7/2003 Thoma ........................ 475/83

FOREIGN PATENT DOCUMENTS
JP 63-92859 U 6/1988
JP 2-31056 A 2/1990

* cited by examiner

Primary Examiner—Dirk Wright
(74) Attorney, Agent, or Firm—Foley & Lardner

(57) ABSTRACT

A power transmission system includes an input shaft, a toroidal CVT arranged on the input shaft, a countershaft arranged parallel with the input shaft for transferring power output from the CVT to wheels, a power distributing device for distributing power from the countershaft to the front and rear wheels, a first casing for defining a first compartment accommodating the CVT, a second casing disposed adjacent to the first casing and for defining a second compartment accommodating the power distributing device, a separation wall arranged between the first compartment and the second compartment and for sealing the compartments in a fluid-tight manner, and first and second oils charged in the first and second compartments and having different characteristics.

13 Claims, 5 Drawing Sheets

POWER TRANSMISSION SYSTEM

BACKGROUND OF THE INVENTION

The present invention relates generally to a power transmission system for motor vehicles, which changes automatically engine output rotation and transfers it to driving wheels, and more particularly, to a power transmission system for four-wheel drive vehicles, which distributes power to front and rear wheels.

Typically, a power transmission system for four-wheel drive vehicles with a toroidal continuously variable transmission (CVT) comprises a power distributing device provided to the toroidal CVT on the rear side of the vehicle and for distributing to the rear and front wheels rotation obtained by converting rotation input from the engine.

However, this power transmission system raises the following problems. Since the power distributing device is linked to the toroidal CVT in the unit to share the use of oil, the device has a large friction loss. Specifically, due to its structure of transferring torque through shearing force of an oil film between power rollers and input and output discs, the toroidal CVT uses traction oil, which is large in friction loss during engagement of gears.

Moreover, sharing of oil increases a moving amount of oil in the power transmission system, leading to difficult establishment of the oil level.

SUMMARY OF THE INVENTION

It is, therefore, an object of the present invention to provide power transmission systems comprising a toroidal CVT and a power distributing device, which allow a reduction in friction loss of the power distributing device and in moving amount of oil in the power transmission system.

The present invention provides generally a power transmission system for a motor vehicle with an engine and front and rear wheels, which comprises: an input shaft which inputs power from the engine; a toroidal CVT arranged on the input shaft, the CVT being able to continuously convert power from the input shaft; a countershaft arranged parallel with the input shaft, the countershaft transferring power output from the CVT to the wheels; a power distributing device which distributes power from the countershaft to the front and rear wheels; a first casing which defines a first compartment, the first compartment accommodating the CVT; a second casing disposed adjacent to the first casing and defining a second compartment, the second compartment accommodating the power distributing device; a separation wall arranged between the first compartment and the second compartment, the separation wall sealing the compartments in a fluid-tight manner; and first and second oils charged in the first and second compartments, the first and second oils having different characteristics.

BRIEF DESCRIPTION OF THE DRAWINGS

The other objects and features of the present invention will become apparent from the following description with reference to the drawings, wherein.

DETAILED DESCRIPTION OF THE INVENTION

Figure 1:
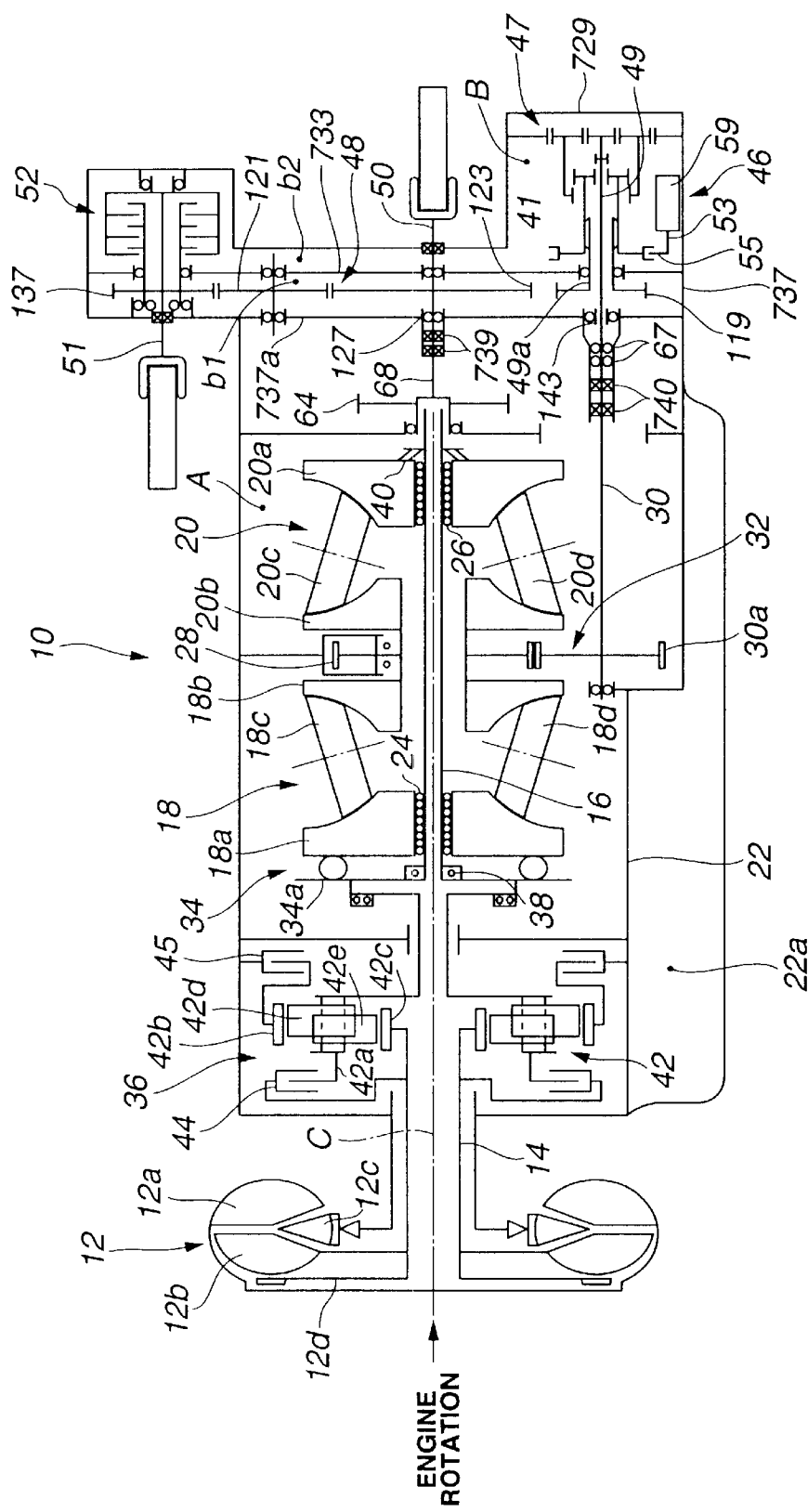
FIG. 1 is a block diagram showing a first embodiment of a power transmission system according to the present invention.

Referring to the drawings, the power transmission system for a motor vehicle embodying the present invention is described.

Referring to FIG. 1, there is shown first embodiment of the present invention, wherein the power transmission system comprises a toroidal CVT 10 and a power distributing device 46.

Referring to FIG. 1, rotation of an engine or a power source, not shown, arranged at the left in FIG. 1 is input to the toroidal CVT 10 through a torque converter 12. As is well known in the art, the torque converter 12 comprises a pump impeller 12a, a turbine runner 12b, and a stator 12c. In this embodiment, the torque converter 12 further comprises a lockup clutch 12d. An output rotation shaft 14 of the torque converter 12 is disposed coaxial with an engine output shaft or center axis C.

The toroidal CVT 10 comprises an oil pan or receiver 22a arranged in a lower portion of a housing 22, and a first compartment A having an outer periphery defined by the housing 22. Arranged in the first compartment A is a torque transfer shaft or first shaft 16 disposed coaxial with the output rotation shaft 14. A first toroidal transmission unit 18 and a second toroidal transmission unit 20 are arranged tandem on the torque transfer shaft 16. The first and second toroidal transmission units 18, 20 comprise a pair of first input and output discs 18a, 18b, a pair of second input and output discs 20a, 20b, each disc having an opposite face formed with a toroidal curve, and two pairs of power rollers 18c, 18d; 20c, 20d, each power roller being in frictional contact with the opposite faces of the discs.

The power rollers 18c, 18d; 20d, 20d are disposed symmetric with respect to the center axis C. In a manner disclosed in JP-U 63-92859, each power roller is controlled to be inclined through a control valve and a hydraulic actuator, not shown, in accordance with the operating conditions of the vehicle, thus continuously changing rotation of the input discs 18a, 20a for transfer to the output discs 18b, 20b.

The torque transfer shaft 16 includes a hollow shaft, and is mounted in such a manner that slight axial movement is allowed with respect to the housing 22.

The first toroidal transmission unit 18 is disposed on the torque transfer shaft 16 at the left in FIG. 1, whereas the second toroidal transmission unit 20 is disposed thereon at the right in FIG. 1. The first and second input discs 18a, 20a are arranged outside, respectively, and are mounted to the torque transfer shaft 16 through ball splines 24, 26 so as to be immovable in the direction of rotation but smoothly movable in the axial direction.

On the other hand, the first and second output discs 18b, 20b are spline engaged with an output gear 28 relatively rotatably engaged with the torque transfer shaft 16. Torque transferred to the first and second output discs 18b, 20b are transmitted to an input gear 30a provided to a countershaft or second shaft 30 through the output gear 28. The output gear 28 and the input gear 30a constitute a first transmission gear 32.

A loading-cam device 34 is arranged outside the first input disc 18a or at the left in FIG. 1. The loading-cam device 34 receives output rotation of the torque converter 12 through a forward-reverse switching device 36 to produce pressing force in response to the input torque. The loading-cam device 34 comprises a loading cam 34a relatively rotatably engaged with the torque transfer shaft 16 and held thereon through a thrust bearing 38.

A disc spring 40 is arranged between the second input disc 20a and the torque transfer shaft 16 at a right end in FIG. 1. Therefore, pressing force produced by the loading-cam device 34 acts not only on the first input disc 18a, but also on the second input disc 20a through the torque transfer shaft 16 and the disc spring 40. And preloading force produced by the disc spring 40 acts not only on the second input disc 20a, but also on the first input disc 18a through the torque transfer shaft 16 and the loading-cam device 34.

The forward-reverse switching device 36 comprises a double-pinion type planetary gear set 42, a forward clutch 44 which can engage a carrier 42a of the planetary gear set 42 with the output rotation shaft 14, and a reverse brake 45 which can engage a ring gear 42b of the planetary gear set 42 with the housing 22.

The forward-reverse switching device 36 is constructed so that rotation in the same direction as that of engine rotation is input to the toroidal CVT 10 by engaging the forward clutch 44 and releasing the reverse brake 45, and rotation in the opposite direction is input thereto by releasing the forward clutch 44 and engaging the reverse brake 45. The planetary gear set 42 further comprises a sun gear 42c and pinions 42d, 42e engaged with each other.

The countershaft 30 receives output rotation of the first and second toroidal transmission units 18, 20 through the first transmission gear 32, rotation of which is input to the power distributing device 46. The power distributing device 46 comprises a high-low switching mechanism 41 arranged in a second compartment B having an outer periphery defined by a transfer casing 737 and a transfer cover 729, a second transmission gear 48, and a clutch mechanism 52. The second compartment B is partitioned by a spacer 733 arranged between the transfer casing 737 and the transfer cover 729 to define a front compartment portion b1 for accommodating a gear 119, an idler gear 121, a rear-wheel-side input gear 123, and a front-wheel-side input gear 137 which constitute the second transmission gear 48 and a rear compartment portion b2 for accommodating the high-low switching mechanism 41 and the clutch mechanism 52. Therefore, the rear wheels are driven through the countershaft 30, the high-low switching mechanism 41, the gear 119, the idler gear 121, the rear-wheel-side input gear 123, and a first output shaft 50, whereas the front wheels are driven through the high-low switching mechanism 41, the gear 119, the idler gear 121, the front-wheel-side input gear 137, the clutch mechanism 52, and a second output shaft 51.

Figure 2:
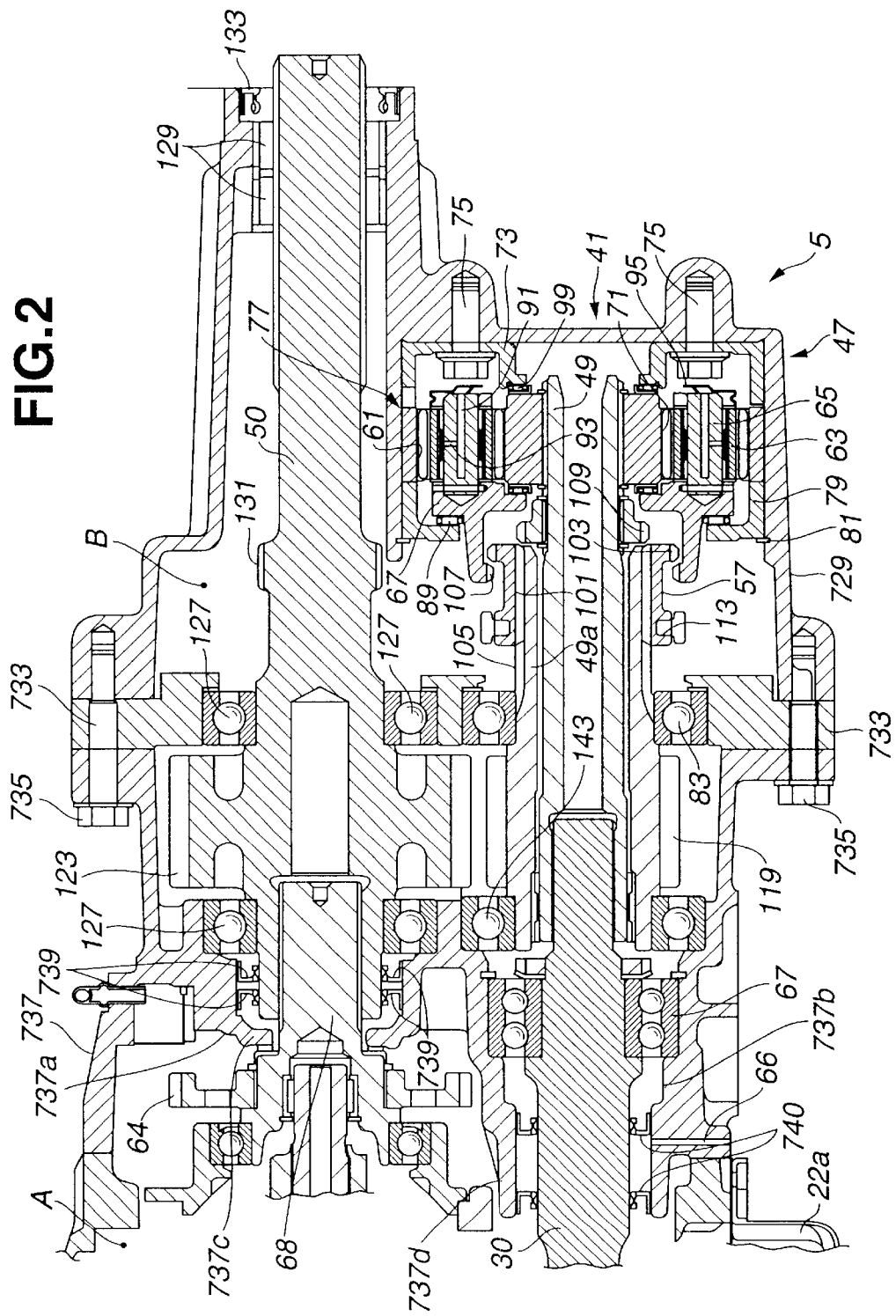
FIG. 2 is a sectional view taken along the line II—II in FIG. 5, showing a second embodiment of the present invention.
Figure 3:
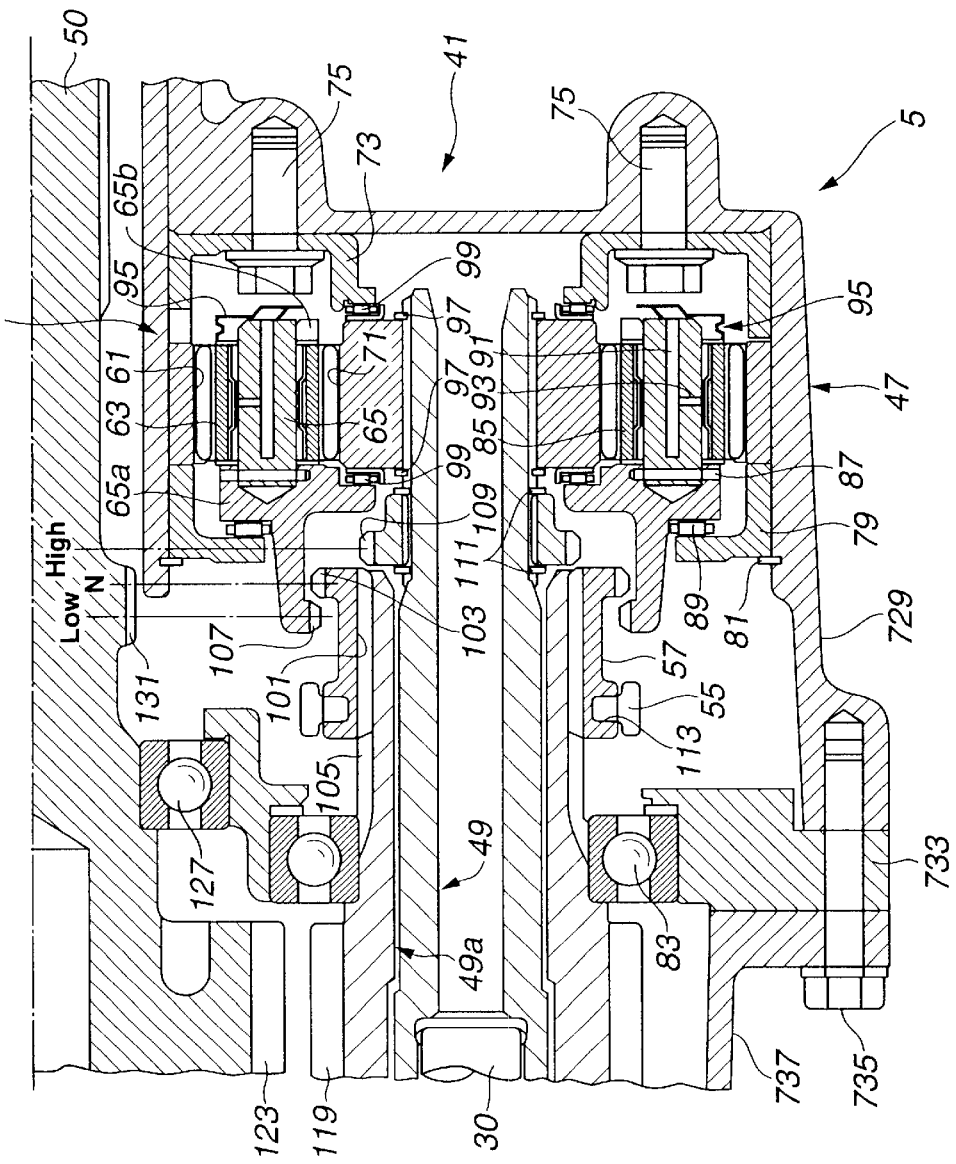
FIG. 3 is a fragmentary enlarged sectional view of FIG. 2, showing a power distributing device in the second embodiment.
Figure 4:
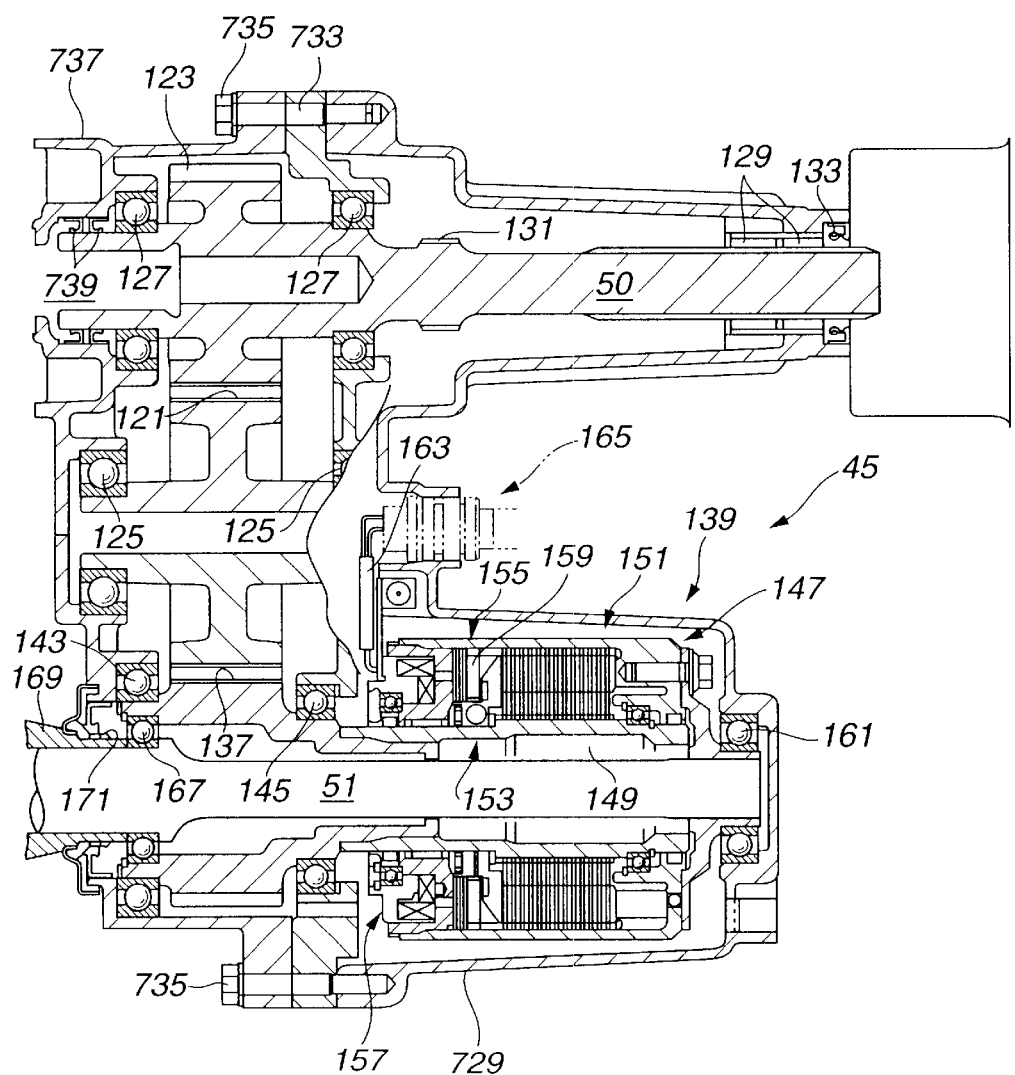
FIG. 4 is a fragmentary sectional view taken along the line IV-O-IV in FIG. 5, showing the power distributing device in the second embodiment.
Figure 5:
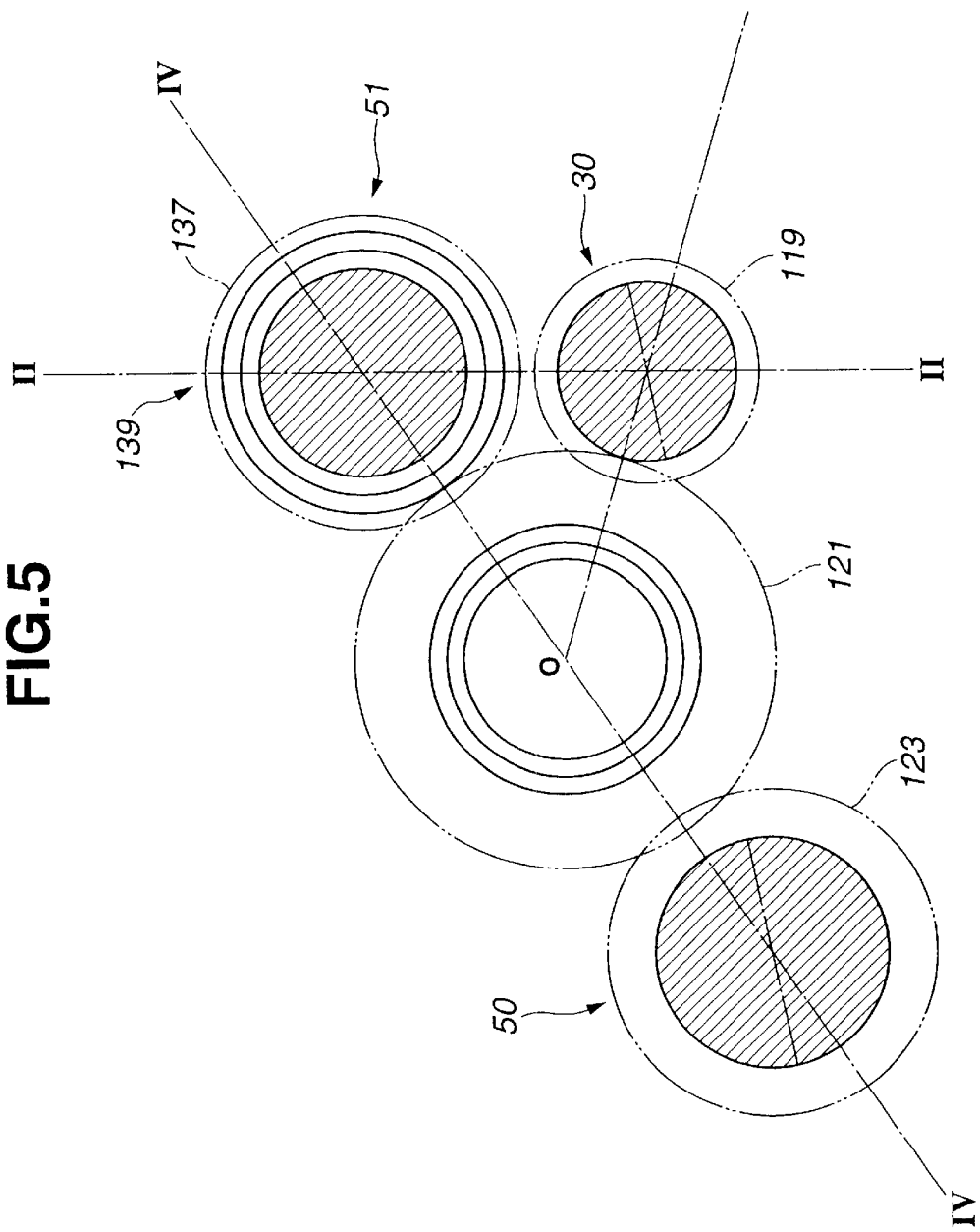
FIG. 5 is a schematic drawing showing the positional relationship between shafts of the power distributing device in the second embodiment.

Referring to FIGS. 2–5, there is shown second embodiment of the present invention. FIG. 2 is a sectional view taken along the line II—II in FIG. 5, showing the power distributing device 46. FIG. 3 is an enlarged sectional view of FIG. 2, showing, particularly, the high-low switching mechanism 41. The high-low switching mechanism 41 is disposed at the rear end of the countershaft 30 and in the rear compartment portion b2 of the second compartment B. The high-low switching mechanism 41 comprises a single-pinion type planetary gear set 47, an input shaft 49, a high-low sleeve 57, etc.

The planetary gear set 47 is mounted to the transfer cover 729 as described later. The transfer cover 729 is mounted to the transfer casing 737 by a bolt 735 to have the space 733 therebetween.

The transfer casing 737 is formed with a separation wall 737a for defining the first and second compartments A, B. The separation wall 737a has a through hole 737c disposed coaxial with the torque transfer shaft 16 and for rotatably supporting one end of the first output shaft 50 and through which a support member 68 for supporting a parking gear 64 is arranged, and a through hole 737b formed in the inner peripheral face of a tubular part 737d having a front end protruding toward the toroidal CVT 10 and for rotatably supporting the countershaft 30. A bearing 67 is disposed in the through hole 737b at the position axially closer to the power distributing device 46 than a seal 740 so as to rotatably support the countershaft 30.

Seals 739, 740 are arranged in the through holes 737c, 737b, each seal including a double seal to define the first and second compartments A, B in a fluid-tight manner. A bleeder hole 66 is formed in the transfer casing 737 at the position between the sealing members of the seal 740 to allow communication between the inside of the power transmission system and outside air. Oil with high traction coefficient and friction coefficient or so-called traction oil is charged in the first compartment A, whereas oil with lower traction coefficient and friction coefficient than traction oil or so-called ATF (automatic transmission fluid) is charged in the second compartment B.

Referring to FIGS. 2 and 3, the planetary gear set 47 comprises an internal gear 61, four pinions 63 disposed circumferentially equidistantly, pinion carriers 65a, 65b for supporting pinion shafts 65 which supports the pinions 63 from the fore-and-aft direction, a sun gear 71, etc.

An inner casing 73 is fixed to the transfer cover 729 by a bolt 75. The internal gear 61 is mounted to the inner casing 73 by an engagement 77 formed between the internal gear 61 and the inner casing 73, and is subjected to rotation locking. And the internal gear 61 is centered by the inner periphery of the transfer cover 729.

Another inner casing 79 is arranged at the inner periphery of the transfer cover 729 to abut on the internal gear 61, and is fixed by a snap ring 81 to axially position the internal gear 61.

As shown in FIG. 2, the input shaft 49 is spline coupled to the countershaft 30 at the rear end, whereas the output shaft 49a is disposed at the outer periphery of the input shaft 49 to be coaxial therewith and rotatable relatively. Moreover, the output shaft 49a is supported to the spacer 733 through bearings 83, 143, whereas the input shaft 49 is supported by the output shaft 49a. In such a manner, the input shaft 49 and the output shaft 49a are of the double-shaft structure.

The pinion 63 is supported on the corresponding shaft 65 through a needle bearing. The shaft 65 is fixed to the front carrier 65a by a spring pin, and is subjected to rotation locking and disengagement stop. A thrust bearing 89 is arranged between the front carrier 65a and the inner casing 79 to undergo thrust force at the time of high-low switching.

The shaft 65 is formed with axial and radial oil passages 91, 93 which communicate with each other, and has an oil channel 95 mounted thereto at the rear end.

The oil channel 95 is formed with four oil receivers corresponding to the rear end of the shafts 65. The oil channel 95 serves to accumulate ATF splashed by peripheral rotating members in the oil receivers, which is led via the oil passage 91 and the oil passage 93 to a needle bearing 85 for lubrication and cooling thereof.

The sun gear 71 is spline coupled to the input shaft 49 at the outer periphery, and is axially positioned by snap rings 97 mounted to the input shaft 49 at both ends. Thrust bearings 99 are arranged between the sun gear 71 and the front carrier 65a and between the sun gear 71 and the inner casing 73, respectively, to undergo thrust force at the time of high-low switching.

The high-low sleeve 57 is formed with a spline 101 at the inner periphery and an intermediate gear 103 of external teeth at the outer periphery. Through the spline 101, the high-low sleeve 57 is axially movably coupled to a spline 105 formed at the outer periphery of the output shaft 49a. The front carrier 65a is formed with a low gear 107 of internal teeth, from which the intermediate gear 103 of the high-low sleeve 57 can be engaged and disengaged.

A high gear 109 of external teeth which can be engaged and disengaged from the spline 101 is spline coupled to the input shaft 49, and is axially positioned by snap rings 111 at the front and the rear.

A change-speed fork 55 has a front end slidably engaged with a peripheral groove 113 of the high-low sleeve 57. An actuator 59 moves the high-low sleeve 57 forward and backward through a change-speed pull-rod 53 and the change-speed fork 55.

With this motion, the high-low sleeve 57 is moved to a high position where the spline 101 is engaged with the high gear 109, a neutral position where engagement of the spline 101 with the high gear 109 is released, or a low position where the front carrier 65a of the intermediate gear 103 is engaged with the low gear 107.

When the high-low sleeve 57 is moved to the high position, rotation input to the input shaft 49 through the countershaft 30 is transferred to the output shaft 49a at uniform (high) velocity, detouring the planetary gear set 47.

When the high-low sleeve 57 is moved to the neutral position, the output shaft 49a is separated from the input shaft 49, interrupting torque transfer. At the high and neutral positions, the sun gear 71, the pinions 63, and the carriers 65a, 65b of the planetary gear set 47 run idle.

When the high-low sleeve 57 is moved to the low position, rotation is returned at the position of the planetary gear set 47 for transfer to the output shaft 49a. Specifically, rotation of the input shaft 49 is input to the planetary gear set 71 through the sun gear 71 to obtain reduced rotation, which is transferred to the output shaft 49a (at low velocity) through the high-low sleeve 57.

As shown in FIG. 2, the gear 119 is formed at the outer periphery of the output shaft 49a, and the rear-wheel-side input gear 123 is formed on the first output shaft 50. As shown in FIG. 4, the idler gear 121 is supported to the transfer casing 737 and the spacer 733 by a bearing 125, whereas the first output shaft 50 has a front end supported to the transfer casing 737 and the spacer 733 by a bearing 127 and a rear end supported by a bearing 129.

A pulse gear 131 for a speed meter is formed with the first output shaft 50, and a seal 133 is arranged between the first output shaft 50 and the transfer cover 729 to prevent oil leakage.

Torque transferred to the output shaft 49a of the high-low switching mechanism 41 is transmitted to the rear wheels through a rear-wheel-side traction transmission system comprising idler gear 121 and first output shaft or rear-wheel-side traction output system 50.

As shown in FIG. 4, a front-wheel-side traction output system comprises front-wheel-side input gear 137, an electromagnetic coupling 139, front-wheel-side second output shaft 51, etc.

The input gear 137 is engaged with the idler gear 121 at a different radial or phase position from that of the gear 119 of a rear-wheel-side traction output system and in such a manner as to axially overlap with the gear 119. The input gear 137 is supported to the transfer casing 737 and the spacer 733 by bearings 143, 145.

The electromagnetic coupling 139 is accommodated in the transfer cover 729 which constitutes part of the casing, and comprises a rotary casing 147, a hollow inner shaft 149, a multiple-disc main clutch 151, a ball cam 153, a multiple-disc pilot clutch 155, an electromagnet 157, an armature 159, a controller, etc.

The rotary casing 147 is supported to the transfer cover 729 by a bearing 161, whereas the inner shaft 149 has a front end spline coupled to the front-wheel-side input gear 137 at the outer periphery.

The second output shaft 51 is arranged through the inner shaft 149. Moreover, the second output shaft 51 has a front end supported to the front-wheel-side input gear 137 by a bearing 167 and a rear end spline coupled to the rotary casing 147. A flange 169 of the second output shaft 51 is coupled to a propeller shaft, and a seal 171 is arranged between the flange 169 and the transfer casing 737 to prevent oil leakage.

Next, referring to FIG. 5, lubricating operation in the second compartment B is described. As shown in FIG. 5, the rear-wheel-side input gear 123 is placed at the lowest position. Then, by splashing and scattering ATF accumulated in the neighborhood of the input gear 123, lubrication is carried out, e.g. for the bearings 83, 127, 143 in the second compartment B.

As described above, in this embodiment, the above structure ensures lubrication of the members after the output members of the counter shaft 30, including the bearing 67 for supporting the countershaft 30, with oil with lower traction coefficient and friction coefficient (ordinary ATF) than those of traction oil, and thus allows lubrication of a larger number of members, including the power distributing device 46, with oil with lower traction coefficient and friction coefficient than those of traction oil, resulting in further enhanced fuel consumption.

Further, the tubular part 737d is formed in the through hole 737b of the separation wall 737a to have a front end protruding toward the toroidal CVT 10, allowing not only a reduction in the dead space in the first compartment A and thus in the oil volume for achieving a required oil level, but also further acceleration of oil return to the oil pan 22a arranged in the lower portion of the toroidal CVT 10. This allows enhanced performance of the oil level for the first and second compartments A, B, resulting in prevention of air inhalation of the oil pump and oil spurt of the air breather.

Still further, at least part of the bearing 67 for supporting the countershaft 30 is disposed in the through hole 737b in the tubular part 737d protruding toward the toroidal CVT 10, allowing the position of the second transmission gear 48 to be closer to the separation wall 737a, leading to a reduction in axial dimension thereof.

Furthermore, the seals 739, 740 include a double seal, allowing achievement of the fluid-tight state of not only the second compartment B, but also the first compartment A, leading to sure prevention of oil mixture even if different oils are charged in the compartments A, B.

Further, arrangement of the separation wall 737a prevents movement of a lot of oil to the power distributing device 46 when the vehicle goes up a hill, allowing sure prevention of degradation of fuel consumption due to increase in friction loss of the power distributing device 46 lubricated by splashing oil.

Having described the present invention in connection with the preferred embodiments, it is understood that the present invention is not limited thereto, and various changes and modifications can be made without departing from the scope of the present invention. By way of example, the present invention is applicable not only to the power transmission system comprising high-low switching mechanism 41, but also a power transmission system without such auxiliary transmission. Further, oil is not limited to ATF, and other oils may be used with lower traction coefficient and friction coefficient than those of traction oil used for the toroidal CVT. Furthermore, in the embodiments, the power transmission system is vertically disposed in the vehicle. However, the power transmission system of the present invention is free from the direction of disposition, and thus can horizontally be disposed in the vehicle.

The entire teachings of Japanese Patent Application P2001-377870 filed Dec. 11, 2001 are hereby incorporated by reference.

What is claimed is:

1. A power transmission system for a motor vehicle with an engine and front and rear wheels, comprising:
   an input shaft which inputs power from the engine;
   a toroidal CVT arranged on the input shaft, the CVT being able to continuously convert power from the input shaft;
   a countershaft arranged parallel with the input shaft, the countershaft transferring power output from the CVT to the wheels;
   a power distributing device which distributes power from the countershaft to the front and rear wheels;
   a first casing which defines a first compartment, the first compartment accommodating the CVT;
   a second casing disposed adjacent to the first casing and defining a second compartment, the second compartment accommodating the power distributing device;
   a separation wall arranged between the first compartment and the second compartment, the separation wall sealing the compartments in a fluid-tight manner; and
   first and second oils charged in the first and second compartments, the first and second oils having different characteristics.

2. The power transmission system as claimed in claim 1, wherein the separation wall is formed with a through hole through which the countershaft is arranged.

3. The power transmission system as claimed in claim 2, further comprising in the through hole a bearing for supporting the countershaft and seals for sealing the through hole.

4. The power transmission system as claimed in claim 3, further comprising:
   an oil receiver arranged in a lower portion of the first casing; and
   a tubular part arranged in the through hole, the tubular part protruding toward the first casing over a mating face of the first and second casing,
   wherein the bearing is disposed at an inner periphery of the tubular part,
   wherein the first seal is disposed at the inner periphery of the tubular part and at a position closer to the CVT than the bearing, the first seal ensuring a fluid-tight state of the second compartment, and
   wherein the second seal is disposed at the inner periphery of the tubular part and at a position closer to the CVT than the first seal, the second seal ensuring a fluid-tight state of the first compartment.

5. The power transmission system as claimed in claim 1, wherein the power distributing device carries out lubrication by splashing the second oil in the second compartment in a lower portion of the second casing.

6. The power transmission system as claimed in claim 1, wherein the second oil in the second compartment is lower in traction coefficient and friction coefficient than the first oil in the first compartment.

7. A motor vehicle, comprising:
   an engine;
   front and rear wheels; and
   a power transmission system linked to the engine and the front and rear wheels, the power transmission system comprising:
     an input shaft which inputs power from the engine;
     a toroidal CVT arranged on the input shaft, the CVT being able to continuously convert power from the input shaft;
     a countershaft arranged parallel with the input shaft, the countershaft transferring power output from the CVT to the wheels;
     a power distributing device which distributes power from the countershaft to the front and rear wheels;
     a first casing which defines a first compartment, the first compartment accommodating the CVT;
     a second casing disposed adjacent to the first casing and defining a second compartment, the second compartment accommodating the power distributing device;
     a separation wall arranged between the first compartment and the second compartment, the separation wall sealing the compartments in a fluid-tight manner; and
     first and second oils charged in the first and second compartments, the first and second oils having different characteristics.

8. The motor vehicle as claimed in claim 7, wherein the separation wall is formed with a through hole through which the countershaft is arranged.

9. The motor vehicle as claimed in claim 8, further comprising in the through hole a bearing for supporting the countershaft and seals for sealing the through hole.

10. The motor vehicle as claimed in claim 9, further comprising:
    an oil receiver arranged in a lower portion of the first casing; and
    a tubular part arranged in the through hole, the tubular part protruding toward the first casing over a mating face of the first and second casing,
    wherein the bearing is disposed at an inner periphery of the tubular part,
    wherein the first seal is disposed at the inner periphery of the tubular part and at a position closer to the CVT than the bearing, the first seal ensuring a fluid-tight state of the second compartment, and
    wherein the second seal is disposed at the inner periphery of the tubular part and at a position closer to the CVT than the first seal, the second seal ensuring a fluid-tight state of the first compartment.

11. The motor vehicle as claimed in claim 7, wherein the power distributing device carries out lubrication by splashing the second oil in the second compartment in a lower portion of the second casing.

12. The motor vehicle as claimed in claim 7, wherein the second oil in the second compartment is lower in traction coefficient and friction coefficient than the first oil in the first compartment.

13. A power transmission system for a motor vehicle with an engine and front and rear wheels, comprising:

an input shaft which inputs power from the engine;

a toroidal CVT arranged on the input shaft, the CVT being able to continuously convert power from the input shaft;

a countershaft arranged parallel with the input shaft, the countershaft transferring power output from the CVT to the wheels;

a power distributing device which distributes power from the countershaft to the front and rear wheels;

means for defining a first compartment, the first compartment accommodating the CVT;

means disposed adjacent to the first compartment defining means for defining a second compartment, the second compartment accommodating the power distributing device;

a separation wall arranged between the first compartment and the second compartment, the separation wall sealing the compartments in a fluid-tight manner; and first and second oils charged in the first and second compartments, the first and second oils having different characteristics.

* * * * *